United States Patent [19]
Pedersen

[11] 3,895,883
[45] July 22, 1975

[54] PROPELLER PITCH INDICATOR

[76] Inventor: James Miller Pedersen, 3809 Puget Dr., Vancouver, British Columbia, Canada

[22] Filed: Oct. 29, 1973

[21] Appl. No.: 410,343

[52] U.S. Cl. .................................................. 416/61
[51] Int. Cl. .............................................. B63h 3/00
[58] Field of Search ..................................... 416/61

[56] References Cited
UNITED STATES PATENTS

| | | | |
|---|---|---|---|
| 2,307,040 | 1/1943 | Hammond | 416/61 X |
| 2,355,039 | 8/1944 | Eves | 416/61 |

FOREIGN PATENTS OR APPLICATIONS

| | | | |
|---|---|---|---|
| 802,737 | 6/1936 | France | 416/61 |
| 848,267 | 7/1939 | France | 416/61 |
| 397,450 | 6/1933 | United Kingdom | 416/61 |
| 576,046 | 3/1946 | United Kingdom | 416/61 |

Primary Examiner—Everette A. Powell, Jr.
Attorney, Agent, or Firm—Carver and Company

[57] ABSTRACT

Indicator for a marine controllable pitch propeller mounted on solid or hollow tailshaft. Indicator is free of inaccuracies arising from tailshaft compression and lost motion between linkages. Components of indicator that are susceptible to wear are generally accessible for servicing without dry-docking vessel. Indicator has sensor connecting electrical position transducer to a component within the propeller hub, which component moves in response to pitch change. The transducer can be mounted within the hub, or on the tailshaft externally of the hub, electrical output from transducer being transmitted from tailshaft through a rotary contact unit using conducting rings engaged by brushes. Galvanometer calibrated in pitch reflects current from transducer which is dependent on pitch of propeller. Sleeve conduit provides clearance for output from sensor through bearing sleeve without boring tailshaft.

10 Claims, 16 Drawing Figures

PROPELLER PITCH INDICATOR

BACKGROUND OF THE INVENTION

1. Field of the Invention

The invention relates to a propeller pitch indicator for use with a controllable pitch marine propeller.

2. Prior Art

Marine controllable pitch propellers have been available for many years and a common difficulty in such propellers relates to providing a reliable mechanism which indicates accurately the pitch of the propeller. Pitch changing mechanism of some propellers is actuated by hydraulic fluid pressure which is exerted on a fluid piston mechanism within the propeller hub. Propeller pitch in such types of propellers is usually obtained by measuring pressure of fluid after the fluid passes through a variable metering orifice. The degree of metering or restriction of the orifice is dependent on pitch of the propeller, and thus pressure of the fluid indicates propeller pitch. A common fault with such an indicator is that a fluid temperature change produces a corresponding change in fluid viscosity with a corresponding change in fluid pressure. Because temperature and viscosity compensation of such devices is difficult, accuracy of such indicators is relatively poor.

Other types of propeller pitch indicators utilize a mechanical linkage connecting a pitch changing mechanism within the hub through a hinged link and shaft arrangement to a dial gauge indicating pitch. Such arrangements commonly use a hollow tailshaft, the linkage passing through the tailshaft. Inaccuracies arise due to lost motion at connections in the linkage, and compensation for such lost motion is complex and requires maintenance to compensate for wear. A further fault, inherent in a mechanical linkage system, arises from tailshaft compression resulting from propeller thrust. Such compression is appreciable with relatively long tailshafts of powerful vessels and, because the compression varies with propeller thrust such compression is inherently difficult to compensate.

A difficulty common to both hydraulic and mechanical pitch read-out systems arises at a point of transfer of the pitch read-out signal from the rotating propeller hub and shaft, to a stationary indicator dial. With a hydraulic system, a rotary hydraulic seal is required which has well known difficulties of fluid leakage at high fluid pressures. With a mechanical linkage system, a swash plate or other device is required and such a transfer means has inherent wear problems due to friction which results in low accuracy of pitch read-out.

SUMMARY OF THE INVENTION

The invention reduces difficulties of prior art propeller pitch indicators by providing an indicator which operates independently of hydraulic fluid and complex mechanical linkages and is unaffected by shaft compression. The invention uses electrical current for transfer of a pitch signal from a rotating shaft to a stationary indicator and this transfer is effected through a simple rotary contact arrangement. A pitch sensor of the present indicator can be fitted within the propeller hub, or externally from the hub. A link between the hub and the pitch indicator dial is external of the tailshaft and thus a solid tailshaft can be used eliminating costly boring of the tailshaft. In some arrangements, this provides a pitch indicator that is easily accessible without the vessel being dry-docked, and facilitates fitting and maintenance of such an indicator.

A propeller pitch indicator according to the invention indicates pitch of a controllable pitch propeller at a station remote from the propeller. The propeller has a hub and a pitch reflecting means of the hub movable relative to a hub datum to reflect pitch of the propeller. The indicator includes a sensor cooperating with the hub to rotate therewith, the sensor having inner and outer ends. The outer end has a stylus engaging the pitch reflecting means and being movable relative to the hub datum, and the inner end is responsive to movement of the outer end. A position transducer has a resistance member coupled to an electrical power source so as to conduct electrical current to produce an electrical potential drop across the resistance member. A movable contact member is adapted to sweep the resistance member so as to provide a variable potential at the contact member proportional to position of the contact member relative to the resistance member. The contact member is coupled to the stylus and is responsive to position of the stylus relative to the hub datum. Thus the contact member is at an electrical potential dependent on position of the stylus, and thus reflects pitch of the propeller.

A galvanometer is fitted in the vessel remote from the hub, and stationary relative to the vessel, the galvanometer being connected to the contact member and the power source and thus is responsive to current from the contact member. The current from the contact member is dependent on pitch of the propeller and the galvanometer is adapted to indicate pitch of the propeller. A rotary contact unit electrically couples the galvanometer and the electrical power source to the position transducer, so as to transmit current from the rotating shaft to the stationary galvanometer.

A detailed disclosure following, related to drawings, describes several embodiments of the invention, which however are capable of expression in structure other than that particularly described and illustrated.

DETAILED DISCLOSURE

Figures 1, 2, 3, 4:
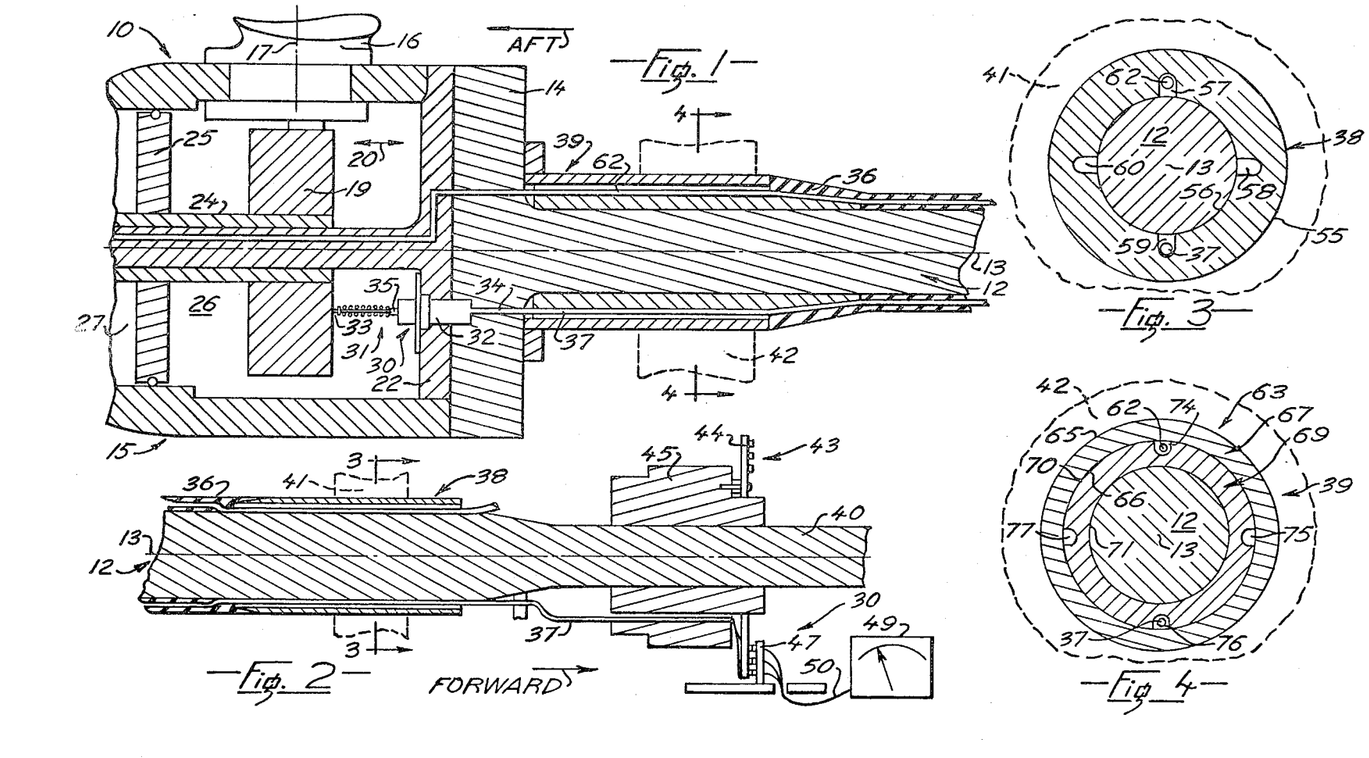
FIG. 1 is a simplified fragmented section on a centre line of an aft portion of a tailshaft and a forward portion of a typical controllable pitch propeller fitted with one embodiment of propeller pitch indicator according to the invention.
FIG. 2 is a simplified fragmented section showing a forward portion of the tailshaft of FIG. 1.
FIG. 3 is a simplified detail section of a sleeve conduit taken on 3—3 of FIG. 2.
FIG. 4 is a simplified detail section of an alternative sleeve conduit taken on 4—4 of FIG. 1.

FIGS. 1 and 2

A propeller hub 10 of a marine vessel (not shown) is mounted on a tailshaft 12 journalled for rotation relative to the vessel about a longitudinal axis 13, the shaft having a propeller hub flange 14 at an aft end thereof to which the propeller is secured. The propeller has a hub 15 carrying a plurality of propeller blades, a portion of one blade only, designated 16 being shown. The blade is rotatable about a blade axis 17 to change pitch of the propeller, the rotation being accomplished by longitudinal movement of a crosshead 19 in directions as shown by double-headed arrow 20. The crosshead 19 cooperates with the blade 16, and the remaining blades (not shown) so that position of the crosshead relative to a datum, for example a forward wall member 22 of the propeller hub, reflects pitch of the propeller. The crosshead 19 is secured to a slidable shaft 24 carrying a piston 25, the piston defining fore and aft chambers 26 and 27 on either side of the piston. To change pitch, fluid is fed into one chamber, and scavenged from the other chamber, resulting in axial movement of the piston, with corresponding axial movement of the crosshead which rotates the propeller blades simultaneously about respective blade axes to change propeller pitch. The crosshead 19 thus serves as a pitch reflecting means in the hub movable axially relative to the hub datum to reflect pitch of the propeller, and clearly other components of the hub could serve a similar purpose.

A pitch indicator 30 according to the invention has at one end a sensor 31 cooperating with the hub to rotate therewith. The sensor has an outer end 33 engaging the crosshead 19 and being movable relative to the hub, and an inner end (not shown) responsive to movement of the outer end. A precision position transducer 35 is coupled to the sensor and rotates with the sensor and the tailshaft, the transducer being described in more detail with reference to FIGS. 5 and 8. The wall member 22 has a bore 32 cooperating with the transducer. A wire bundle 37 extends from the transducer, passes through the bore 32 and a passage 34 in the flange 14 which is aligned with the bore 32. The wire bundle extends through an aft sleeve 39 adjacent the flange 14 and along the shaft 12 to a forward sleeve 38. Between the forward and aft sleeves 38 and 39 the wire bundle is supported in a matrix of reinforced plastic resin 36. The wire bundle 37 extends through passages or sleeve conduits in the sleeves, to be described with reference to FIGS. 3 and 4, and couples the transducer 35 to a pitch read-out means to be described. The tailshaft 12 is supported at an aft end in an aft bearing 42 shown in broken outline, the bearing journalling the sleeve 39.

With reference to FIG. 2 the shaft 12 has a forward end 40 coupled to a power transmission means (not shown) for example an output shaft from a power turbine. A stuffing box 41 (broken outline) cooperates with the sleeve 38 and seals the forward end of the shaft from ingress of water. Thus portions of the shaft forward of the stuffing box are dry. A rotary contact unit 43 is mounted concentric with and secured to the shaft to rotate therewith, the unit being connected by the wire bundle 37 to the transducer 35.

The rotary contact unit 43 has a rotor 44 secured concentrically to the shaft by a bushing 45, the rotor rotating with the shaft. A pick-up means 47 is secured to a support (not shown) fixed relative to the vessel, and cooperates with the rotor to receive electrical signals from the transducer as will be described in greater detail with reference to FIGS. 6 through 8. A galvanometer 49 is coupled to the pick-up means 47 by a wire bundle 50 and is fitted at a station in the vessel remote from the hub so as to provide a remote read-out of pitch of the propeller. An electrical circuit associated with the transducer, the rotary contact unit and the galvanometer is described in greater detail with reference to FIG. 8.

FIGS. 3 and 4

With reference to FIG. 3, the sleeve 38 has an axial length, an outer surface 55 serving as a bearing or sealing surface for the stuffing box 41 (broken outline), and an inner surface 56 which is held in an interference fit with an outer surface of the tailshaft 12, for example by shrinking the sleeve onto the shaft. The inner surface 56 has a plurality of axial grooves 57 through 60, the grooves extending the length of the sleeve and being generally aligned with passages in the propeller flange, the passage 34 which is aligned with the groove 59 being typical of the passages. The groove 59 thus defines a passage between the sleeve and the tailshaft serving as a sleeve conduit. The passage above carries the wire bundle 37 from the hub and the groove 57 forms a further passage which carries a hydraulic hose 62 passing into the propeller hub for pitch changing purposes. Other hydraulic hoses (not shown) can be carried in the grooves 60 and 58 for pitch changing and other purposes as required. The number of grooves required is dependent on the particular hydraulic circuit of the pitch changing mechanism in the propeller hub.

With reference to FIG. 4 the aft bearing 42 similarly journals the aft sleeve 39, which sleeve has a sleeve assembly 63 having an outer sleeve 67 and an inner sleeve 69, the sleeve 67 being secured to and enclosing the sleeve 69. The sleeve 67 has outer and inner surface 65 and 66, the surface 66 contacting an outer surface 70 of the sleeve 69. The inner sleeve 69 has an axial length and an inner surface 71 similarly in contact with the outer surface of the tailshaft 12, the sleeves being suitably shrunk onto each other and onto the shaft to prevent relative movement therebetween. The outer surface 70 of the inner sleeve has a plurality of axial grooves 74 through 77 extending along the length of the inner sleeve. The grooves 74 and 76 are aligned with the grooves 57 and 59 in the sleeve 38 and are aligned with corresponding passages in the propeller flange 14. These grooves similarly define passages between the inner and outer sleeves and carry the hydraulic hose 62 and the wire bundle 37. The grooves 75 and 77 are similarly aligned with the grooves 58 and 60 to conduct other hoses or service conduits as required.

The axial grooves 57 through 60, 74 through 77 are thus effectively passages extending axial lengths of the sleeves 38 and 39 respectively, and serve as sleeve conduits for electrical wires and hydraulic hoses extending from the hub and passing through tailshaft bearings, the stuffing box or other components. Hereinafter such components fixed relative to the vessel are termed "shaft enclosures" and wherever the shaft passes through a shaft enclosure, a sleeve similar to the sleeve 38 or 39 is used, the sleeve being provided with sleeve conduits as defined above. Both embodiments of sleeves are easier to manufacture than drilling clearance holes through a sleeve, which sleeve may be 12 inches long or longer. If required, to prevent vibration etc. after insertion of the hose or wire bundle into the passage, a setable resin can be injected into the passage to bond the hose or wire to side walls of the passage.

Such an arrangement as described above permits use of a solid tailshaft for a controllable pitch propeller, and thus theoretically there is no limit on tailshaft length. This is in contrast to a hollow tailshaft, length of which is usually limited by practical limits arising from machining the bore of the tailshaft. An alternative sleeve conduit structure requires cutting axial grooves where the shaft passes through a shaft enclosure. This alternative is described and illustrated with reference to FIGS. 15 and 16.

As previously described, lengths of the wire bundle 37 and hydraulic hoses 62 extending between the sleeves 38 and 39 are bonded to the tailshaft 12 with a setable reinforced resin to form the matrix 36 of reinforced resin. This prevents the tubes and wires from vibrating and serves to protect them from abrasion and ingress of moisture, thus preventing corrosion. Such an arrangement is easy and relatively cheap to install around the tailshaft and also permits easier access for repair or replacement if required. Thus the propeller hub is serviced with electrical and hydraulic supplies as required, there being essentially no sensible limit to the number of individual grooves that can be provided in the sleeves. The embodiment is shown with the aft sleeve 39 having a sleeve assembly of two sleeves, while the forward sleeve has one sleeve. Clearly the positions of the sleeves can be reversed, or if required both sleeves can be according to either embodiment. Also if a hollow tailshaft were substituted for the solid tailshaft, if necessary the hydraulic hoses and electrical wires could pass through the bore of the tailshaft.

Figure 5:
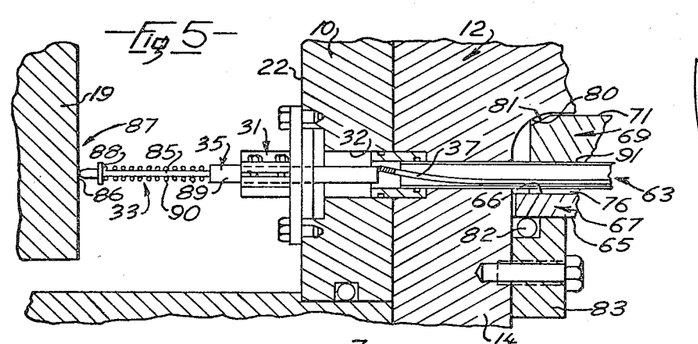
FIG. 5 is a fragmented detail section showing an aft portion of the propeller pitch indicator of the FIG. 1 embodiment.
Figure 6:
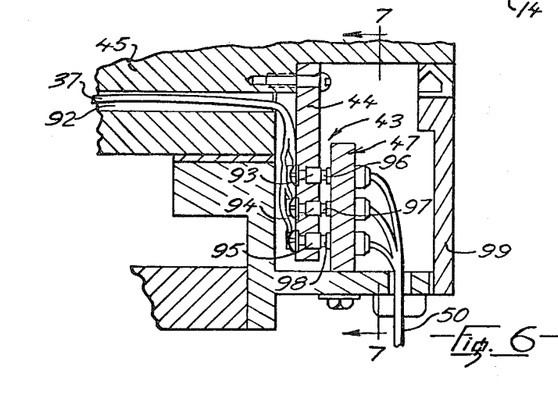
FIG. 6 is a fragmented detail section of a forward portion of the propeller pitch indicator of the FIG. 1 embodiment.
Figure 7:
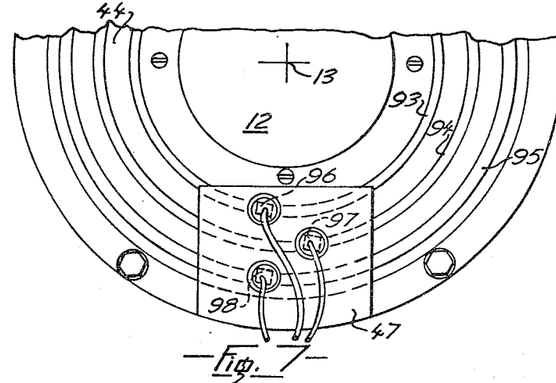
FIG. 7 is a fragmented simplified detail view as seen from 7—7 of FIG. 6, some portions being omitted.

FIGS. 5 through 7

The sleeve assembly 63 has an aft end adapted to accommodate a radiused fillet 80 extending between the shaft 12 and the propeller flange 14. The inner surface 71 of the inner sleeve 69 has a bevelled aft end 81 as shown which is held against the fillet and prevents aft movement of the sleeve. Note that the passage 34 in the flange is clear of the fillet 80 to reduce stress concentration on the fillet. The groove 76 is aligned with the passage 34 in the flange 14, and the remaining grooves (not shown) are similarly aligned with corresponding passages (not shown) in the flange. Radial alignment as above is attained by positioning the passage 34 relative to the shaft axis between the sleeve outer surface 70 and an innermost wall of the groove, that is radius of the surface 70 minus groove depth. An O-ring seal 82, held in place by a retaining ring 83 secured to the flange, prevents ingress of water.

The sensor 31 includes a straight rod 85 having an outer end 86 having a stylus 87, and an inner end (not shown) coupled to a contact member (not shown) within a body 89 of the position transducer 35. The body 89 is secured to the hub in a bore in the member 22 and has a longitudinal bore (not shown) parallel to the hub axis. The rod has a size acceptable to the bore, so that the inner end of the rod is supported in the bore. A resistance member (not shown in FIG. 5) within the body is secured to the body adjacent the inner end of the rod and adapted to be swept by the contact member, as will be described with reference to FIG. 8. The outer end of the rod has a shoulder 88 and a coil spring 90 extends between the body and the shoulder so as to urge the stylus outwards from the body. The stylus is thus spring-urged against the pitch reflecting means so as to follow movements of the pitch reflecting means. The rod 85 thus serves as an input rod of the transducer. An aft portion of the wire bundle 37 extends from the forward end of the position transducer and passes through the bore 32 in the member 22 into the aligned passage 34 in the flange 14. A tube 91 extends from the passage 34 in the aligned axial groove 76 in the sleeve 39, the tube carrying the wire bundle which then extends towards the rotary contact unit 43 (FIG. 6). Because the transducer is within the hub it is exposed to the environment of the hub interior which, for a hydraulically-operated hub, is hydraulic fluid, usually under scavenge pressure. Thus the transducer is required to withstand such an environment.

With reference to FIG. 6, the rotor 44 of the unit 43 is secured to the shaft 12 (not shown) by the bushing 45 which has a bore 92 to pass the wire bundle 37 as shown. The rotor 44 carries first, second and third conducting rings designated 93, 94, 95 respectively, each ring being coupled to a respective wire within the wire bundle 37. Each conducting ring is insulated from the rotor 44 and from adjacent conducting rings and is swept by a respective conducting brush, three brushes namely, first, second and third brushes 96, 97, 98 being shown and mounted in the pickup means 47. The conducting rings 93 through 95 are disposed concentrically relative to the shaft and are surfaces of revolution centered on axis 13 of the shaft 12. The rings can be disposed on a diametrically plane surface of the rotor 44 as shown, or if desired, can be on a conical or cylindrical surface, the last two alternative surfaces not being illustrated.

The rotary contact unit 43 is positioned so as to cooperate with the tailshaft in a position forward of the stuffing box, that is in a dry portion of the tailshaft. It is thus accessible for servicing and requires little maintenance apart from replacement of worn brushes. As will be explained, electrical current between a brush and a respective ring is relatively low, usually of the order of a few milliamps, which represents pitch signal output of the transducer. The unit 43 is usually protected from contamination by a housing, a portion of a wall 99 of which being shown, the wire bundle 50 extending from the housing as shown.

Figure 8:
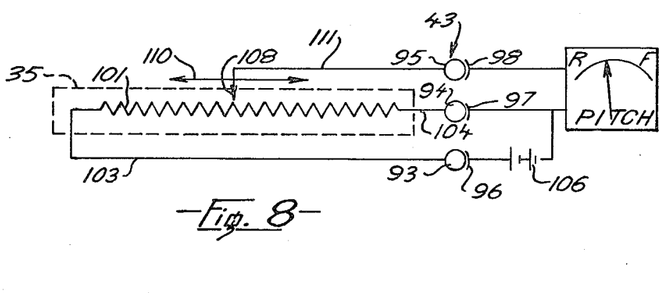
FIG. 8 is a simplified schematic showing an electrical circuit of the propeller pitch indicator according to the invention.

FIG. 8

The position transducer 35 is shown as a linear transducer, the body 89 of which is shown schematically, in broken outline. The transducer has a resistance member 101 secured to the body and coupled by electrical conductors 103 and 104 to a battery 106 serving as electrical power source. The resistance member has an electrical resistance directly proportional to distance from one end of the resistance member. When the member 101 conducts an electrical current it produces a linear electrical potential drop across the resistance member. A moveable contact member 108 is adapted to sweep the resistance member as shown by a double-headed arrow 110 so as to pick-up the potential of the resistance member at the point of contact of the contact member. This provides a variable potential at the contact member proportional to position of the contact member relative to the resistance member. The contact member is coupled to the sensor (not shown) and is responsive to the position of the stylus (not shown) relative to the hub datum, so that the contact member is at an electrical potential dependent on the position of the stylus. The potential of the contact member is transmitted to the galvanometer 49 through a conductor 111 connected to the rotary contact unit 43, the galvanometer being calibrated in inches of pitch, or other suitable means directly indicating pitch of the propeller.

The transducer is selected so as to have a resolution of about 0.030 inches, that is the transducer is capable of detecting a movement of approximately 0.030 inches, which for a controllable pitch propeller of approximately 200 inches total pitch represents an incremental pitch change of approximately one-quarter of an inch of pitch. A suitable transducer is manufactured by Bourns Incorporated, a corporation of California, U.S.A. In a transducer manufactured by Bourns, the input rod 85 is integral with the transducer, the contact member being provided at an inner end of the rod.

As previously stated the position transducer is electrically connected to the galvanometer and the electrical power source through the rotary contact unit 43, shown schematically as the three conducting rings 93 through 95 swept by three conducting brushes 96 through 98. The first and second conducting rings 93 and 94 are connected to the resistance member 101 to conduct electrical current to the resistance member 101 to conduct electrical current to and from the contact member. The pick-up means 47 has the first and second brushes conducting electric current to and from the resistance member, the third brush 98 contacting the third ring 95 to conduct current from the contact member to the galvanometer. The galvanometer is connected so that full scale deflection of the galvanometer represents total travel of the contact member from one end of the resistance member to the other, that is full sweep of the resistance member. This corresponds to the maximum travel of the crosshead from a full-ahead position to a full-astern position. Such an arrangement provides maximum accuracy for a given set-up, however for particular installations an incomplete sweep of the resistance member might result in full scale deflection of the galvanometer, or if required, for greater accuracy, various scales on the galvanometer could be provided to permit accurate reading of pitch for a limited sweep of the contact member.

ALTERNATIVES AND EQUIVALENTS

The device of FIGS. 1 through 7 discloses a pitch indicator in which the transducer is positioned within and secured relative to the hub. Such an arrangement has the advantage that there is minimum mechanical connection between the pitch reflecting means and the position transducer and is preferred where long tailshafts are used, and where difficulties associated with servicing a transducer positioned within the hub are relatively immaterial. The transducer also must withstand the environment of the hub interior, i.e., immersed in hydraulic fluid.

Figure 9:
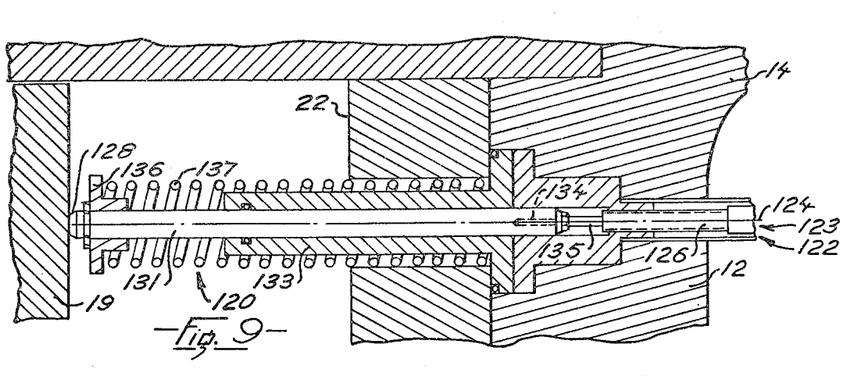
FIG. 9 is a simplified fragmented detail section of an aft portion of an alternative propeller pitch indicator according to the invention.

FIG. 9

An alternative pitch indicator 120 is shown in FIG. 9 in which the transducer is positioned remote from the hub, and a mechanical connection extends between the pitch reflecting means in the hub and the position transducer. Such an arrangement has an advantage for servicing the transducer which is secured to a forward portion of the shaft and can be positioned inboard of the stuffing box. Thus the transducer is not exposed to the fluid of the hub, and does not require removal of the hub for service. As the transducer is positioned inboard of the stuffing box, dry docking of the vessel in not required for servicing the transducer.

An alternative sensor 122, serving as the mechanical connection between the stylus and transducer, includes a precision, sheathed, control link 123 having a longitudinal axis 124, the link being capable of transmitting force in both directions along the axis. The link has outer and inner ends 126 and 127, the outer end 126 being coupled to an alternative stylus 128 which is in engagement with the crosshead 19 of the hub. The outer end of the sensor is a plunger 131 having an outer end serving as the stylus 128, a body 133 secured to the hub having a bore to mount the plunger slidably so as to permit axial sliding of the plunger in response to movement of the crosshead. The plunger has an inner end 134 which is coupled to the outer end 126 of the link 123 by a link input rod 135, the rod 135 being coupled to the link as will be described with reference to FIG. 12. The outer end of the plunger has a shoulder 136, a coil spring 137 extending between the shoulder and a portion of the body so as to urge the stylus 128 out from the body of the sensor to maintain engagement with the crosshead.

Figures 10, 12:
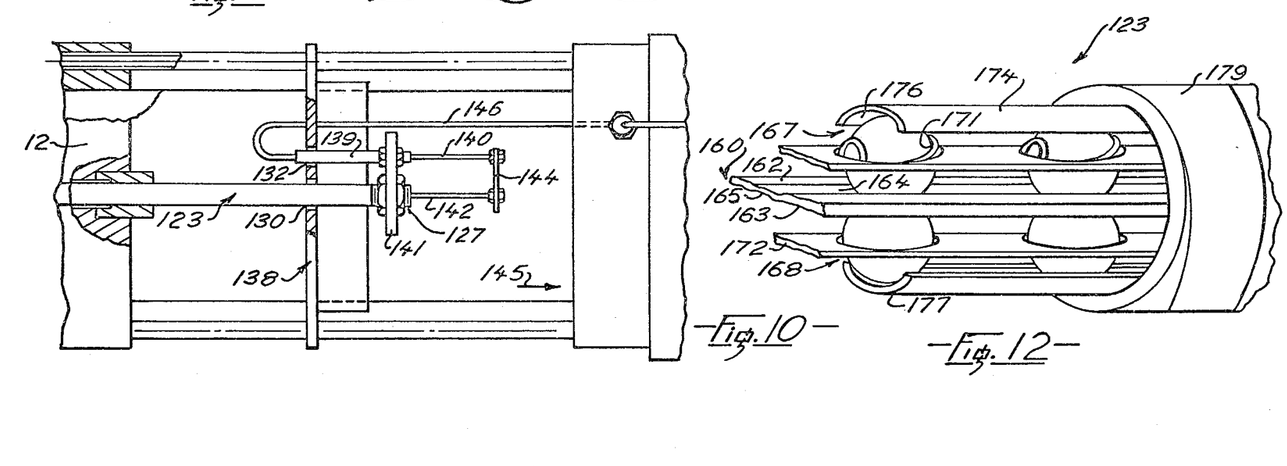
FIG. 10 is a simplified fragmented detail section showing a forward portion of the indicator of the FIG. 9 embodiment.
FIG. 12 is a fragmented detail section through a portion of a precision control link used in the FIG. 9 embodiment of the invention.

With reference to FIG. 10, a linear position transducer 139 has a body and an input rod 140 extending axially of the body, the contact member of the transducer (not shown) being coupled to the rod so as to sweep the resistance member (not shown) in response to axial movement of the rod. A support 138 secured to the tailshaft has clearance bores 130 and 132 accepting the inner end 127 of the link 123 and the transducer 139 respectively in sliding fits, so as to position the link and the transducer radially relative to the tailshaft 12 (not shown) so as to rotate therewith. The clearance bores permit axial sliding of the link and the transducer to compensate for tailshaft compression. Thus only the outer end of the sheath is fixed axially relative to the tailshaft and portions of the sheath remote from the outer end are permitted to move axially relative to the tailshaft. Adjacent ends of the link 123 and transducer 139 are secured together by a transverse support 141, which cooperates with nut means on the link and transducer to provide accurate adjustment of relative axial positioning of the link and transducer so as to attain a desired zero datum condition. Thus the transducer is secured to the inner end of the sheath so as to move axially therewith to accommodate tailshaft compression, and to rotate with the tailshaft. The inner end 127 of the link 123 has an output rod 142 coupled to an inner portion of the link as will be described with reference to FIG. 12, the rod 142 being disposed parallel to the input rod 140. A bridging member 144 is secured to the rods 140 and 142 so as to couple the rods together, so that forward movement of the rod 142 in a direction of an arrow 145 produced a corresponding equal movement of the rod 140. This movement is reflected as a proportional change in output signal from the transducer. A wire bundle 146 extends from the output of the transducer 139 to a rotary contact unit (not shown) similar to the unit 43 of FIG. 6.

Figure 11:
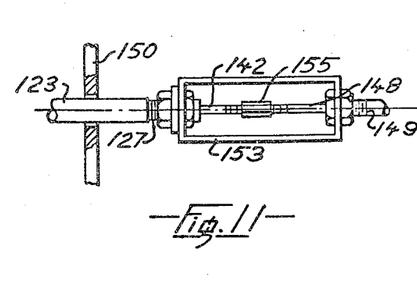
FIG. 11 is a simplified fragmented detail of an alternative forward portion of the indicator of FIG. 9.

FIG. 11

The output rod 142 and the transducer input rod 140 are disposed parallel to each other in FIG. 10, which arrangement provides a degree of flexibility for axial positioning of the transducer relative to the rod. An alternative arrangement is shown in FIG. 11 in which the output rod 142 of the control link 123 is axially aligned with an alternative transducer input rod 148 of an alternative transducer 149. An alternative support 150 secured to the tailshaft has a clearance bore to accept the inner end 127 of the control link in a sliding fit. Thus the end of the link is secured relative to the shaft so as to rotate therewith, but is free to slide axially to accommodate tailshaft compression. A yoke member 153 extends axially from the end 127 to an opposite end which is secured to the alternative transducer 149. An internally threaded sleeve 155 accepts ends of the output rod 142 and the input rod 148 so that forward movements of the rod 142 results in an inward movement of the rod 148 into the transducer with a corresponding change in output. Thus the yoke member maintains the transducer and end 127 at a constant spacing and compensates for tailshaft compression. Such an arrangement is mechanically more simple, but due to axial alignment of the rods 142 and 148, is less flexible in design than the arrangement of FIG. 10.

FIG. 12

The control link 123 is known as a linear ball bearing and includes a central flexible strip 160 having parallel side edges and first and second opposed surfaces 162 and 163. Each surface has a continuous axial groove extending therealong serving as first and second inner ball races designated 164 and 165 respectively. A first row of spaced balls 167, two balls only being shown, is provided adjacent the first surface 162, the balls engaging the first race 164. A similar second row of balls 168 is provided adjacent the second surface and similarly engages the second race 165. The first row of balls is spaced by a first longitudinal ball guide 170 having openings to accept the balls, one opening being designated 171. The guide is spaced from the first surface 162 and engages the balls so as to maintain separation between the balls. A similar second longitudinal ball guide 172 engages the second row of balls 168 on a side of the strip remote from the first ball guide.

A first outer longitudinal ball race 174 is spaced from the first surface 162, and has a longitudinal groove 176 extending therealong, the groove accepting the first row of balls 167 as shown. The guide 170 is positioned between the first outer race 174 and the flexible strip 160. A second similar outer longitudinal race 177 is provided spaced from the second surface 163 and engaging the second row of balls 168.

A flexible cylindrical sheath 179 encloses the central strip 160, the two rows of balls 167 and 168, the two ball guides 171 and 172 and the outer ball races 174 and 177 so as to form a portion of the complete link. The outer ball races are secured to the sheath at diametrically opposite positions so as to prevent relative movement therebetween, clearance between the inner and outer races and the central strip being such that the central strip is free to slide axially relative to the sheath serving as a control rod, the balls supporting the central strip against excessive deviation from the central axis. The input rod 135, (FIG. 9) and the output rod 142 (FIG. 10) are secured to opposite ends of the flexible strip 160 forming the control rod coupling the stylus to the input rod 140 of the transducer. The outer end of the sheath is secured to the hub so as to be fixed relative to the hub datum and the inner end 127 is mounted for axial sliding as described, thus ensuring that tailshaft dimensional changes resulting from tailshaft compression are not transmitted to sheath 179.

A linear ball race as described above is marketed under the registered trademark "Controlex," a registered trademark of Controlex Corporation, of New York, U.S.A. Components of the control link are fabricated from stainless steel and other corrosion resistant materials to withstand the extreme conditions of service experienced with marine tailshafts. Such a link can be bent around radii of a minimum diameter, however by careful design the link can be essentially straight extending from the propeller hub to the position transducer positioned at a forward end of the tailshaft and inboard of the stuffing box.

Both embodiments of pitch indicators are shown to have linear position transducers that are coupled to a pitch reflecting means in the hub which moves axially within the hub so as to reflect pitch. Clearly other types of position transducers can be used, for instance a rotary position transducer, which could be coupled to a component which rotates in response to a change in pitch, for instance a component associated with an actual propeller blade. Such an arrangement is not shown, but is clearly an equivalent of the structure disclosed herein.

Figure 13:
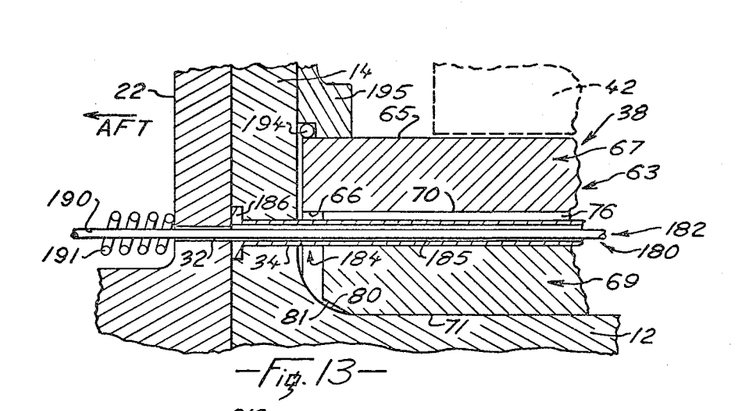
FIG. 13 is a simplified fragmented detail section of a portion of the propeller hub and propeller flange adjacent an aft end of an alternative control link for the pitch indicator of FIG. 9.
Figures 14, 16:
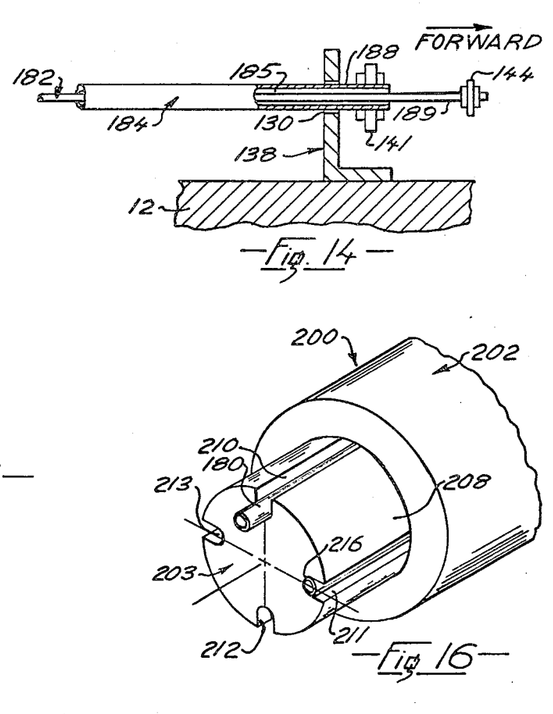
FIG. 14 is a fragmented detail section of a forward portion of the pitch indicator of FIG. 13.
FIG. 16 is a fragmented perspective of a portion of the sleeve conduit of FIG. 15.

FIGS. 13 and 14

The aft portion of the sleeve assembly 63 is shown cooperating with an aft portion of a further alternative control link 180. The link passes through an aft portion of the sleeve assembly and through the bores 34 and 32 in the propeller flange 14 and the forward wall member 22 respectively. The control link includes a relatively stiff cylindrical push rod 182 which serves as a control rod having a diameter sufficient to resist appreciable buckling under relatively low compression forces. The link includes a relatively stiff cylindrical tube 184 enclosing the rod 182, the tube having a bore 185 sufficient to accept the pushrod and to permit free sliding therebetween and to prevent excessive buckling of the pushrod 182. The tube 184 has an outer end 186 secured to the flange 14 by means not shown and thus is fixed relative to the hub. The tube has an inner end 188 held in a sliding fit in the clearance bore 130 in the support 138 similarly to the transducer 139 and the link 123 of the FIG. 10 embodiment. Also as in FIG. 10, the inner end 188 of the tube is secured to a position transducer (not shown) by the transverse support 141, the support 141 cooperating with the undesignated nut means on the link and the body of the transducer (not shown) to provide accurate adjustment of relative axial positioning of the link and transducer so as to attain a desired zero datum condition. Thus the body of the transducer is secured to the inner end of the tube or sheath so as to move axially therewith relative to the tailshaft to accommodate tailshaft compression. The push rod 182 has an inner end 189 secured to the bridging member 144 which is coupled to the input rod of the transducer, as described in FIG. 10.

The pushrod 182 has an outer end 190 coupled to the stylus (not shown), which is held in engagement with the crosshead of the propeller hub (not shown) by a compression spring 191, which acts similarly to the spring 90 of FIG. 5. The inner end of the tube 184 fits in the groove 76 between the inner sleeve 69 and the outer sleeve 67 and extends to a position substantially in contact with the propeller flange 14 similarly to FIGS. 5 and 9.

Thus the control link 180 is a mechanical equivalent of the control link 123 of FIGS. 9 and 10 but is limited to application where the link extends essentially in a straight line from the hub to the transducer. Clearly any excessive bends in the link will cause binding of the pushrod 182 within the tube, which will thus require a heavier spring 191 to maintain engagement with the crosshead. Thus the term "relatively stiff" is limited to sheaths and pushrods that have sufficient stiffness to transmit compression forces without excessive buckling, and yet have sufficient flexibility to follow gentle bends necessary to negotiate obstructions between the hub and the inner end of the shaft.

Figure 15:
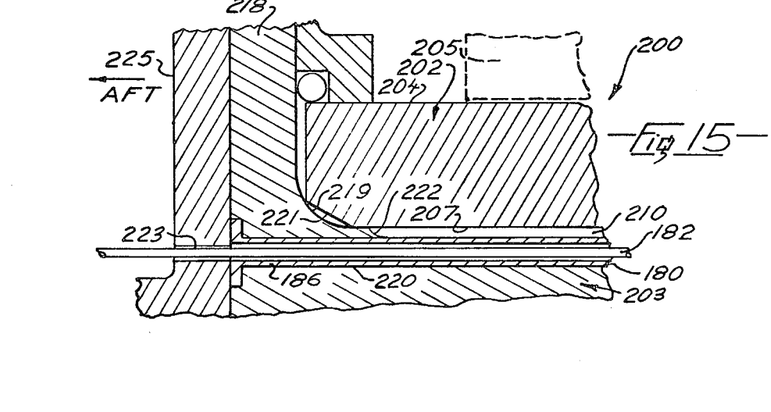
FIG. 15 is a fragmented detail section showing a portion of an alternative sleeve conduit.

FIGS. 15 and 16

An alternative sleeve conduit 200 equivalent to the conduit in the sleeves 38 and 39 has an alternative sleeve 202 fitted on an alternative tailshaft 203. The sleeve has a cylindrical outer surface 204 concentric with the tailshaft and adapted to run within a shaft enclosure, a portion of which is shown in broken outline and designated 205. The sleeve has an inner surface 207 in an interference fit with an outer surface 208 of the tailshaft 203 so as to secure the sleeve to the tailshaft.

The outer surface 208 of the tailshaft has a plurality of axial grooves 210 through 213, the grooves being enclosed by the sleeve where the tailshaft passes through the shaft enclosure. The sleeve has an axial length shorter than the length of the grooves so as to permit insertion of a control link or conduit within the groove. The grooves have a depth which is small compared with radius of the tailshaft so as to have a negligible weakening effect on the tailshaft. The control link 180 of FIG. 13 is shown within the groove 210, and a hydraulic hose 216 is shown within the groove 211. Clearly electrical or pneumatic services can similarly be fitted within the groove. Preferably the link or other service conduit is bonded to sidewalls of the groove to prevent vibration or corrosion. The groove can be continuous along the length of the shaft, and this would be acceptable for a non-flexible link such as the link 180. Alternatively, for a more flexible link, if desired, the groove can be provided only when the tailshaft passes through a shaft enclosure.

As seen in FIG. 15, the tailshaft 203 has a propeller flange 218 faired into the shaft by a radiused fillet 219, substantially similarly to the flange 14 of FIG. 1. The flange 218 has a passage 220 to accept the outer end 186 of the control link 180, the passage 220 being generally aligned with the groove 210 to permit a smooth transition of the control link 180 from the groove into the bore in the flange. Radial alignment of the passage 220 and the groove 210 is attained by positioning the passage 220 relative to the shaft axis between the outer surface 208 and an innermost wall of the groove 210. Thus the passage 220 is positioned at a distance relative to the shaft axis between radius of the tailshaft and radius of the shaft minus groove depth. The passage 220 is aligned with a bore 223 in a forward wall member 225 of the hub, the bore 223 being generally equivalent to the bore 34 of FIG. 1 but spaced inwards to be aligned with the groove 210. The sleeve 202 similarly has a bevelled aft end 221 to accommodate the radiused fillet 219 extending between the propeller flange and the shaft 203. The groove 210 has an aft end 222 clear of the radiused fillet 219 and the passage 220 is similarly clear of the fillet so as to reduce stress concentrations on the fillet.

I claim:

1. A propeller pitch indicator for indicating pitch of a controllable pitch propeller of a marine vessel at a station remote from the propeller, the propeller having a hub, a hub datum, and a pitch reflecting means of the hub movable relative to the hub datum to reflect pitch of the propeller, the propeller being mounted on a tailshaft journalled for rotation relative to the vessel, the indicator including:
   a. a sensor cooperating with the hub to rotate therewith, the sensor including a precision sheathed control link having a longitudinal axis disposed generally parallel to the tailshaft and being capable of transmitting force in both directions along the axis, the link having a sheath and a control rod, the sheath enclosing the control rod and having an outer end secured relative to the hub and the shaft, and an inner end supported radially relative to the tailshaft to rotate therewith, portions of the sheath remote from the outer end thereof being permitted to move axially relative to the tailshaft; the control rod having an outer end cooperating with a stylus engaging the pitch reflecting means, and an inner end responsive to movement of the stylus,
   b. a position transducer cooperating with the inner end of the sensor and adapted to rotate therewith, the transducer having a resistance member coupled to an electrical power source so as to conduct electrical current to produce an electrical potential drop across the resistance member, and a movable contact member adapted to sweep the resistance member so as to provide a variable potential at the contact member proportional to position of the contact member relative to the resistance member, the contact member cooperating with the sensor so as to be responsive to position of the stylus relative to the hub datum so that the contact member is at an electrical potential dependent on position of the stylus, so that output from the transducer reflects position of the pitch reflecting means, c. a galvanometer adapted to be fitted in the vessel remote from the hub so as to be stationary relative to the vessel, the galvanometer being connected to output from the contact member and the electrical power source and being responsive to current from the contact member, which current is dependent upon pitch of the propeller, the galvanometer being adapted to indicate pitch of the propeller, d. a rotary contact unit cooperating with the shaft, the unit connecting electrically the galvanometer and the electrical power source to the position transducer.

2. A propeller pitch indicator as claimed in claim 1 in which the stylus is spring-urged against the pitch reflecting means so as to follow movements of the pitch reflecting means.

3. A propeller pitch indicator as claimed in claim 1 in which i. the transducer is secured to the inner end of the sheath so as to move axially therewith relative to the tailshaft to accommodate tailshaft compression, ii. the contact member cooperates with the control rod.

4. A propeller pitch indicator as claimed in claim 1 in which i. the control is a relatively stiff cylindrical pushrod having a diameter, ii. the sheath is a relatively stiff cylindrical tube enclosing the pushrod and having a bore sufficient to accept the pushrod and permit free sliding therebetween, the tube having an inner end supported radially relative to the tailshaft to rotate therewith and permitted to move axially relative to the shaft to accommodate the tailshaft compression, the rod and sheath having sufficient flexibility to follow gentle bends.

5. A propeller pitch indicator as claimed in claim 1 in which the control link is a linear ball bearing which includes:

i. a central flexible strip serving as the control rod and having parallel side edges and first and second opposed surfaces, each surface having a continuous axial groove extending therealong serving as first and second inner ball races, ii. a first row of spaced balls provided adjacent the first surface of the central strip, the balls engaging the axial groove of the first surface; a second row of spaced balls being provided adjacent the second surface and similarly engaging the axial groove of the second surface, iii. a first longitudinal ball guide having openings to accept the balls, the ball guide being spaced from the first surface of the central strip and engaging the balls so as to maintain separation between the balls; a similar second longitudinal ball guide engaging the second row of balls on a side of the strip remote from the first ball guide, iv. a first outer longitudinal ball race spaced from the first surface of the central strip, the outer ball race having a longitudinal groove extending therealong, the groove accepting the first row of balls, the first longitudinal ball guide being positioned between the first outer ball race and the central flexible strip; a similar second outer longitudinal ball race being provided spaced from the second surface of the central strip and engaging the second row of balls, v. a flexible cylindrical sheath enclosing the central strip, the two rows of balls, the two ball guides and the two outer longitudinal ball races, the outer ball races being secured to the sheath at diametrically opposite positions so as to prevent relative movement therebetween, clearance between the inner and outer races and the central strip being such that the central strip is free to slide axially relative to the sheath, the balls supporting the central strip against excessive deviation.

6. A propeller pitch indicator as claimed in claim 5 in which:

i. the transducer is a linear position transducer having a rod extending axially of the transducer, and the contact member of the transducer being coupled to the rod, ii. the outer end of the sensor is a plunger having an outer end serving as the stylus being in engagement with the pitch reflecting means of the hub, a body secured to the hub slidably mounting the plunger so as to permit axial sliding of the plunger, the plunger having an inner end, iii. the outer end of the link includes an outer end of the central flexible strip coupled to the inner end of the plunger, the sheath being restricted against axial movement relative to the hub, iv. the inner end of the link has an inner end of the central flexible strip coupled to the rod extending axially from the transducer.

7. A propeller pitch indicator as claimed in claim 1 in which the rotary contact unit includes:

i. a rotor secured to the shaft, the rotor having three conducting rings disposed concentrically relative to the shaft, first and second rings being connected to the resistance member to conduct electrical current to and from the resistance member, a third ring being connected to the contact member to conduct current from the contact member, ii. a pick-up means fixed relative to the vessel, the pick-up means having three brushes, each brush contacting a respective ring, first and second brushes contacting the first and second rings to conduct electrical current to and from the resistance member, the third brush contacting the third ring to conduct current from the contact member to the galvanometer.

8. A propeller pitch indicator as claimed in claim 1 in which the tailshaft has a sleeve conduit characterized by:

i. a sleeve secured to the tailshaft, the sleeve having an axial length, an outer surface concentric with the tailshaft and adapted to run within a shaft enclosure fixed relative to the vessel, and an inner surface having a groove extending the length of the sleeve and defining a passage between the sleeve and the tailshaft, the passage providing clearance through the sleeve and the shaft enclosure for a means transmitting pitch signal output of the stylus.

9. A propeller pitch indicator as claimed in claim 1 in which the tailshaft has a sleeve conduit characterized by:

i. a sleeve assembly secured to the tailshaft, the sleeve assembly having an inner sleeve having an axial length and secured to the tailshaft, and an outer sleeve enclosing and secured to the inner sleeve, the outer sleeve having an outer surface concentric with the shaft and adapted to run within a shaft enclosure fixed relative to the vessel, the inner sleeve having an outer surface having a groove extending the length of the inner sleeve so as to define a passage between the inner sleeve and the outer sleeve, the passage providing clearance through the sleeve and the shaft enclosure for a means transmitting pitch signal output of the stylus.

10. A propeller pitch indicator as claimed in claim 1 in which the tailshaft has a sleeve conduit characterized by:

i. the tailshaft having an outer surface having a groove extending therealong, ii. a sleeve having inner and outer surfaces, the inner surface having a length shorter than the length of the groove and being adapted to be secured to the outer surface of the tailshaft, the outer surface of the groove being concentric with the tailshaft and adapted to run within a shaft enclosure between the sleeve and the tailshaft to provide clearance through the sleeve and the shaft enclosure for a means transmitting pitch signal output of the stylus.

* * * * *